Figure 1:
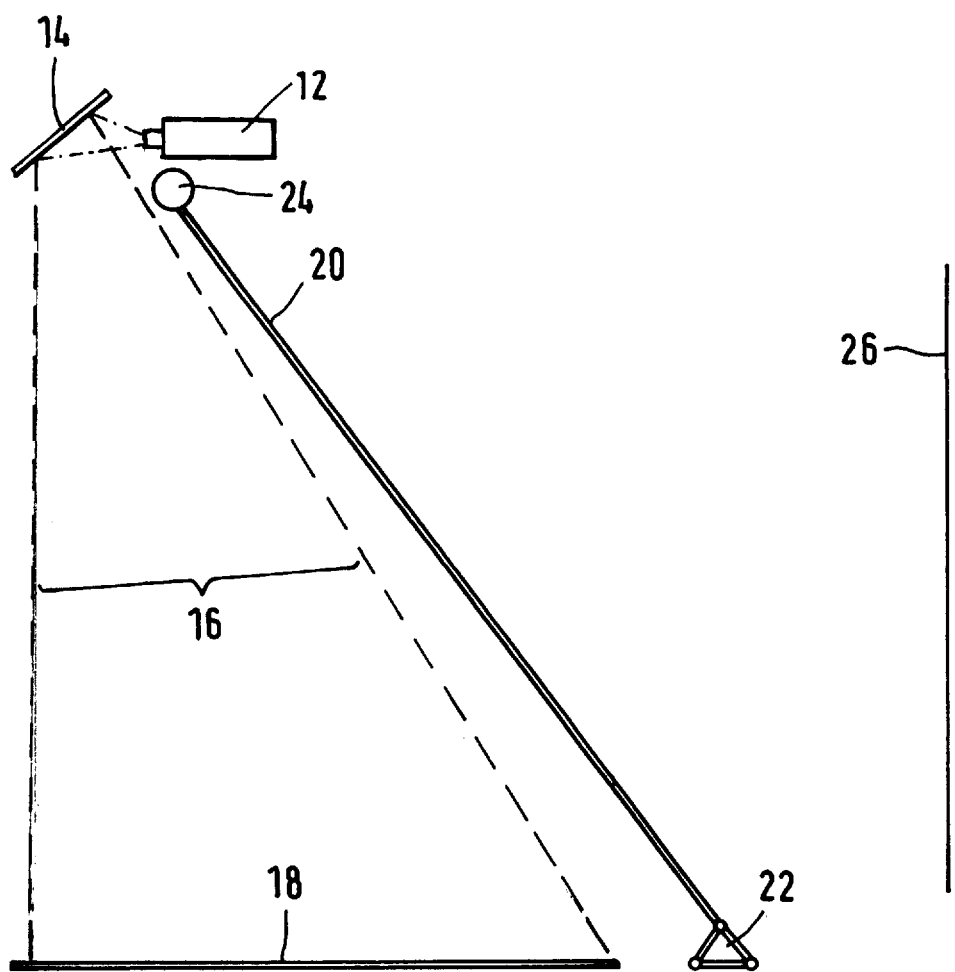

United States Patent
Maass

[19]

[11] Patent Number: 5,865,519
[45] Date of Patent: Feb. 2, 1999

[54] DEVICE FOR DISPLAYING MOVING IMAGES IN THE BACKGROUND OF A STAGE

[76] Inventor: Uwe Maass, Lindlarer Strasse 107, D-51491, Overath, Germany

[21] Appl. No.: 836,911

[22] PCT Filed: Aug. 31, 1996

[86] PCT No.: PCT/EP96/03832

§ 371 Date: Jul. 7, 1997

§ 102(e) Date: Jul. 7, 1997

[87] PCT Pub. No.: WO97/11405

PCT Pub. Date: Mar. 27, 1997

[30] Foreign Application Priority Data

Sep. 20, 1995 [DE] Germany ............ 295 15 073 U

[51] Int. Cl.⁶ .................................................. G03B 21/28
[52] U.S. Cl. ........................... 353/28; 359/630; 472/58
[58] Field of Search ................................. 353/28, 98, 30, 353/29, 10; 359/478, 630; 472/58, 61, 63

[56] References Cited

U.S. PATENT DOCUMENTS

| 1,053,887 | 2/1913 | Sontag . |
| 1,358,110 | 11/1920 | Presicce . |
| 2,198,815 | 4/1940 | Haskin . |
| 3,035,836 | 5/1962 | McCulley .................................. 353/28 |
| 4,805,895 | 2/1989 | Rogers . |
| 5,573,325 | 11/1996 | Lekowski .................................. 353/28 |
| 5,669,685 | 9/1997 | Kotaui et al. ............................. 353/28 |
| 5,685,625 | 11/1997 | Beaver ..................................... 353/28 |

FOREIGN PATENT DOCUMENTS

| 389185 | 9/1908 | France . |
| 408191 | 3/1910 | France . |
| 2714741 | 7/1995 | France . |
| 2039680 | 8/1980 | United Kingdom . |
| WO 89/05682 | 6/1989 | WIPO . |

OTHER PUBLICATIONS

Rasche et al., Buhnentechniche Rundschau (1990) BTR 3:24–5.

*Primary Examiner*—William Dowling
*Attorney, Agent, or Firm*—Klauber & Jackson

[57] ABSTRACT

An article such as for example a motor vehicle at a publicity function is to be represented in front of different viewers (38) in the background of a stage (28) in the form of a virtual image (26). A presenter (40) is to stand in the image and give explanations. Disposed above the stage (28) is an image source (12, 14). It projects an image, a film, on to a reflecting surface (18) on the floor (30) of the stage (28). Behind that reflecting surface (18) a transparent smooth foil (20) extends at 45° from the ceiling (32) to the floor (30). The image produced by the image source (12, 14) appears to the viewers (38) as a virtual image (26) behind the foil (20). The presenter (40) stands behind the foil (20) and in the middle of the image.

15 Claims, 5 Drawing Sheets

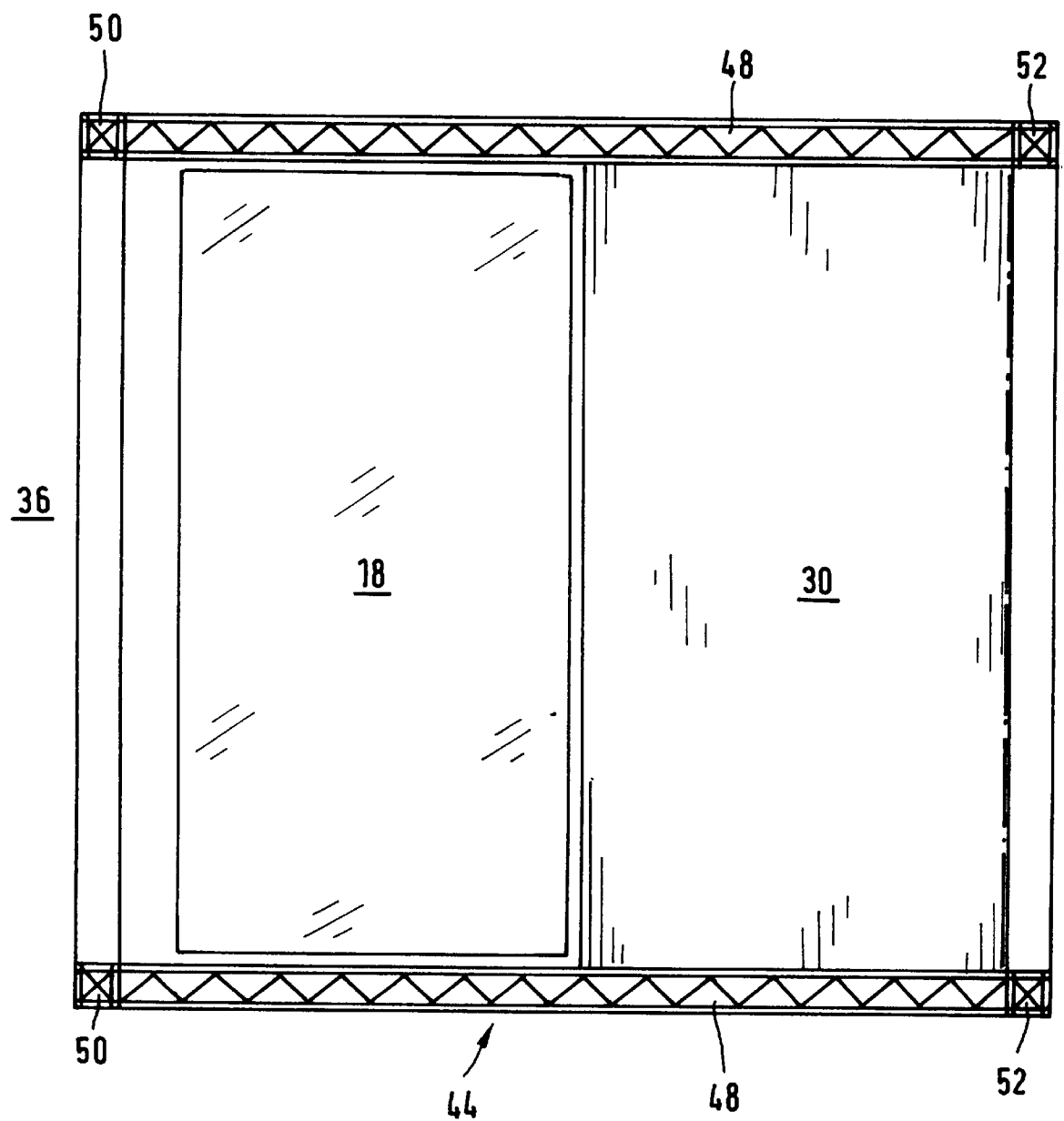

DEVICE FOR DISPLAYING MOVING IMAGES IN THE BACKGROUND OF A STAGE

The invention concerns an apparatus for representing moving images in the background of a stage or the like using an image source.

Transparency lectures or presentations are known, and that expression is a well-established piece of terminology. In a transparency presentation the presenter projects still images or pictures on to a projection screen. The presenter himself stands outside the light cone between the projector and the projection screen and comments on the images. Instead of the transparency projector the presenter can also use a film apparatus. In that case moving images appear on the projection screen and the presenter comments thereon. In both cases the presenter stands outside the light cone. He does not appear on or in the image himself. If he were to move into the light cone he would mask off a part of the light beam. Instead of the image, the shadow of the presenter would then appear on the projection screen. If the presenter wants to direct the attention of his viewers to a given point in the image he uses for that purpose a pointer or a light with a sharply focussed light beam.

The foregoing kind of presentation is sufficient for image and film presentations for photographic and film amateurs. Travellers who show films or transparencies of their travels to a wide circle of viewers can also use that kind of presentation without detriment. The viewers are only interested in the film or the transparencies and the words of the presenter. They attribute only slight significance to the manner of presentation and the technical equipment involved.

The position is different if the viewers do not have any particular interest in the articles to be shown and an interest first has to be aroused. The position is also different when the film presentation is to take place at a high technical level, for overriding reasons. The situation is also different if the film presentation is to be made more relaxed and less monotonous and linked to so-called display effects.

A theatre production is described as a ghost trick in the literature (for example Bühnentechnische Rundschau, BTR 3/1990, pages 24 and 25), involving disposing a pane of glass inclinedly in the front region of the stage. An actor is positioned beneath the pane of glass and in a lowered part of the stage. He is bedecked with wide white garments and represents the ghost. He is lit by a spotlight which is also disposed under the stage. The image of that actor representing the ghost is projected on to the pane of glass and appears to the viewers behind the pane of glass a virtual image. In that theatre presentation a second actor is on the stage. He represents a hero or sorcerer who conjures up the ghost.

On the basis thereof, the object of the present invention is an apparatus with which film and image presentations can be made relaxed and the presenter himself can move into the image without thereby interfering with reproduction of the image on a projection screen or generally on a surface. In accordance with the invention, that object is attained in an apparatus of the kind set forth in the opening part of this specification, in that a reflecting surface is arranged on the floor of the stage in the central region thereof, a transparent smooth foil extends between the floor and the top or ceiling of the stage over the entire width thereof in such a way that its lower end is held to a position between the reflecting surface and the background and its upper end is held to the ceiling at a position which is disposed further forwardly, and the image source is arranged at the ceiling in front of the upper end of the foil which is held there, and is directed on to the reflecting surface.

The apparatus according to the invention makes use of the physical principle that any motor car driver experiences on the windshield of his vehicle. An article lying on the storage surface in front of the windshield is reflected therein in such a way that it seems to the motor car driver to be disposed in front of the windshield, as viewed in the direction of travel. In the case of the apparatus according to the invention the article to be represented is projected by the image source on to the reflecting surface which corresponds to the above-mentioned support surface, and it is then reflected in the transparent smooth foil in such a way that it appears to the viewer on the background of the stage. The foil which extends over the entire width of the stage and which is held to the floor and ceiling thereof acts like the windshield in a motor vehicle. A viewer at any point in the auditorium believes that he is seeing any article reflected by the reflecting surface on to the foil, behind same. The presenter stands on the stage outside the light cone of the image source. As viewed from the auditorium, he stands behind the reflecting surface. That means that his image is not formed on the background, nor does he disturb the image representation thereon. He can draw the attention of the viewers to given details in the image representation, without making use of a pointer or a light. He can likewise move with the images and interpret the reproduction thereof by virtue of his body language.

Desirably the foil extends at an angle of about 45° relative to the floor of the stage. The image source can be a display screen tube with a very high degree of resolution. It can be controlled by a computer. That means that the image can also be electronically influenced. Desirably a computer-controlled intelligent light amplifier (also known as an ILA) is used as the image source. It is oriented horizontally and emits light in the direction of the auditorium. Accordingly its longest extent lies in the horizontal and it can be easily concealed from the viewers. So that the light which it radiates reaches the reflecting surface, a further embodiment provides that a mirror is arranged in front of the computer-controlled light amplifier and the latter is directed on to the mirror and the mirror receives the light emitted by the light amplifier, is directed on to the reflecting surface and projects the light on to same.

If possible the viewer should not notice how the image in the background of the stage is produced. Therefore the light amplifier and the mirror are desirably covered over forwardly by a curtain or a board which extends over the entire width of the stage. The foil itself is under a very high tensile stress of up to 8t. In that way it is held tautly smooth and the image is not distorted. The foil is preferably without any inclusions. It is also to be very smooth on its front side and its rear side. It is also to be very thin. Finally the foil is to reflect between 30 and 50%, preferably 30%, of the light impinging on it. Such a foil is particularly well suited for the purposes according to the invention. The absence of inclusions and the smooth front and rear sides thereof result in very slight and imperceptible distortion effects. The fact that the foil is very thin serves the same purpose. Reflection phenomena at the front and rear sides thereof thus coincide. The foil used for the purposes according to the invention is generally subjected to further processing as transparency or 35 mm films. When used as a transparency film, it is cut up into the format of the transparency or 35 mm films. When it is used for the invention the foil has a surface area of at least 3 m times 4 m.

In a desirable embodiment the foil is rolled on to a winding tube. It is suspended therewith at the ceiling of the stage. Desirably it is fixed to the ceiling, together with the intelligent light amplifier. The free end of the foil can be pulled off the winding tube and is fixed to the floor of the stage. A support mounting arranged on the floor of the stage is used for that purpose.

The reflecting surface may be a white projection screen which is to be laid on to the floor of the stage. The reflecting surface however may also be a simple white coat of paint. As the presenter moves outside it and more specifically behind it, it retains its reflecting properties for a very long period of time.

The apparatus according to the invention is advantageously used in connection with a stage with a floor which can be raised and lowered. The reflecting surface, the projection screen, the coat of paint or the like, is disposed on that part of the floor, which can be raised and lowered. When the floor is lowered the spacing between the image source and the reflecting surface is increased. As a result the virtual image which appears in the background of the stage is displaced rearwardly.

The apparatus according to the invention is to be easy to transport from one location to another and to set up at different locations. For that purpose, in a desirable embodiment, the invention provides that its components are enclosed by a lattice frame and can be secured thereto. Desirably, the lattice frame has units which can be set up on the two sides of the apparatus or the stage thereof and which each have a lower girder portion, an upper girder portion, a front girder portion and a back girder portion. The lattice frame units which can be set up on the two sides of the apparatus or stage can be connected together by transversely extending struts.

Desirably the winding tube is secured to the upper girder portions by way of brackets while the mounting support which holds the free end of the foil is fixed to the lower girder portions.

Figure 2:
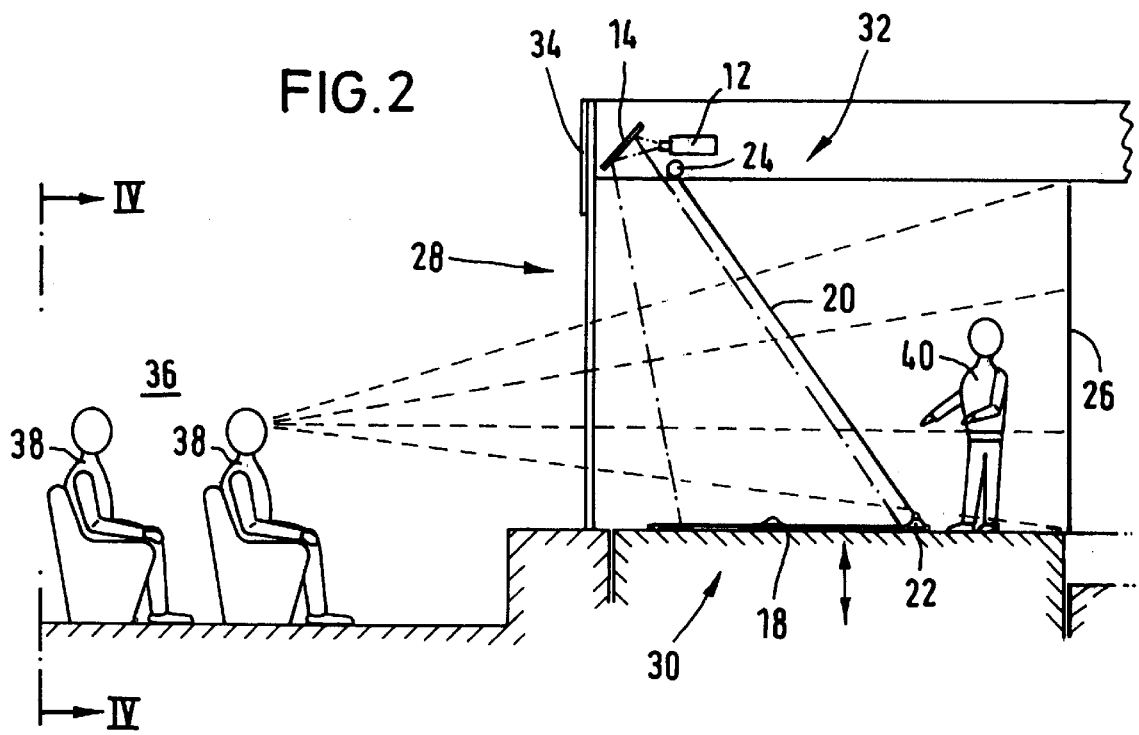
Figure 3:
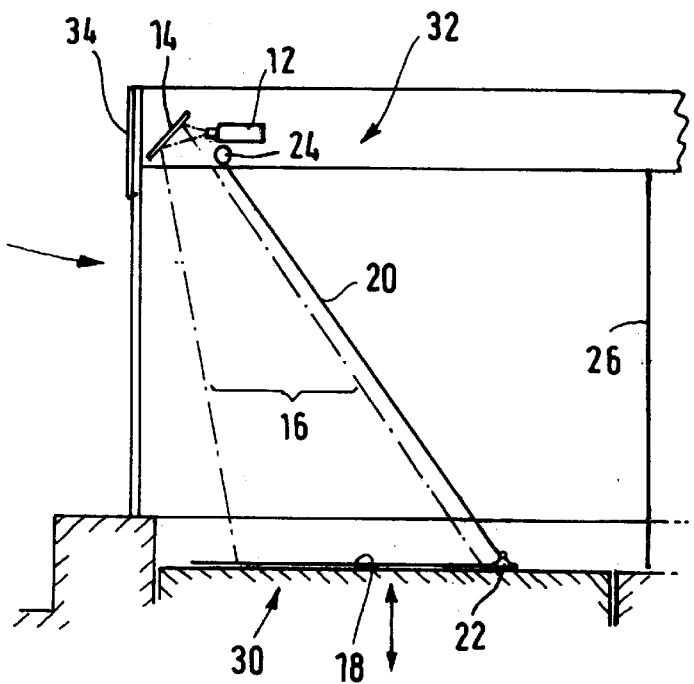
Figure 4:
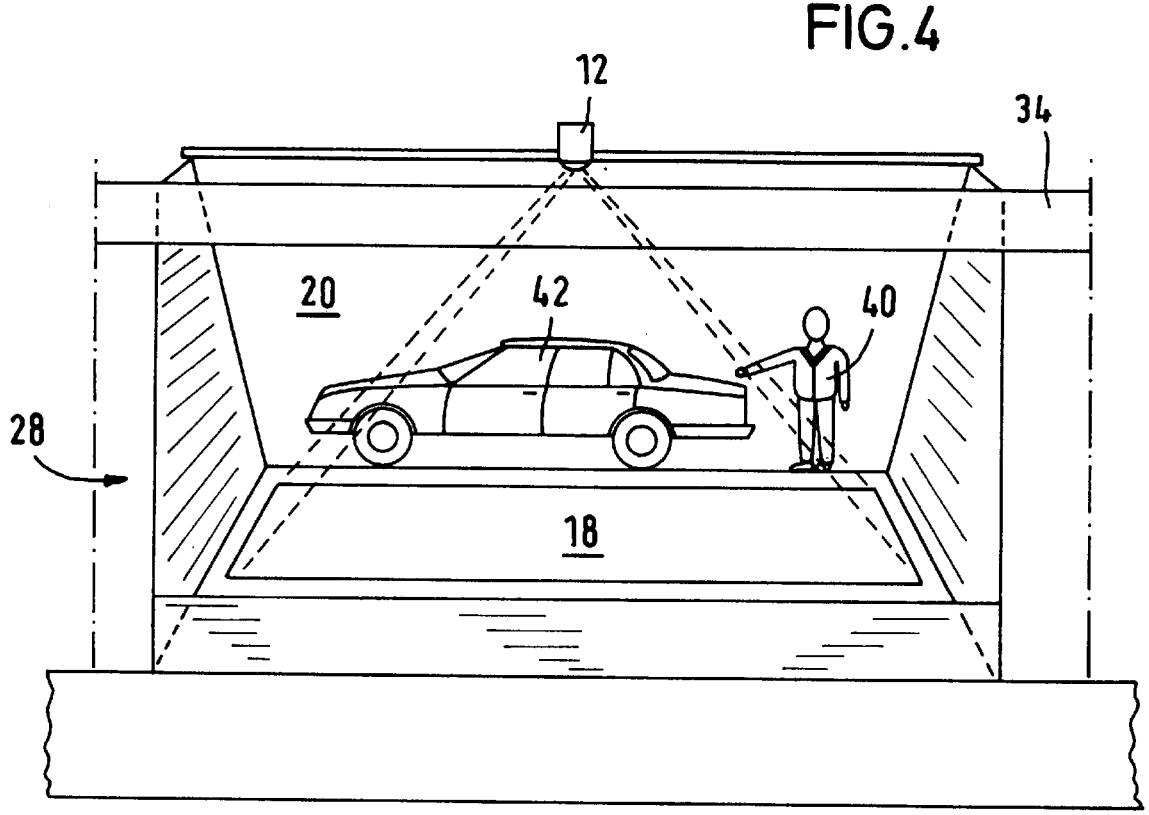
Figure 4:
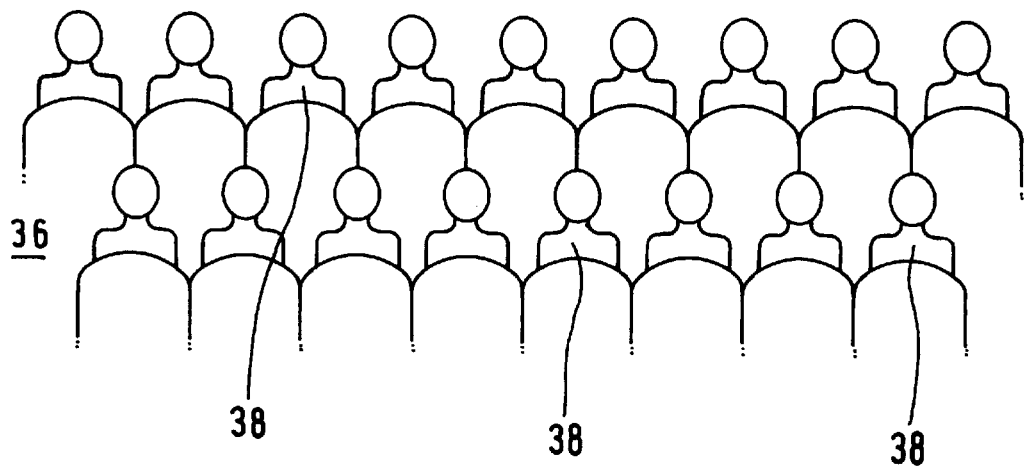
Figure 5:
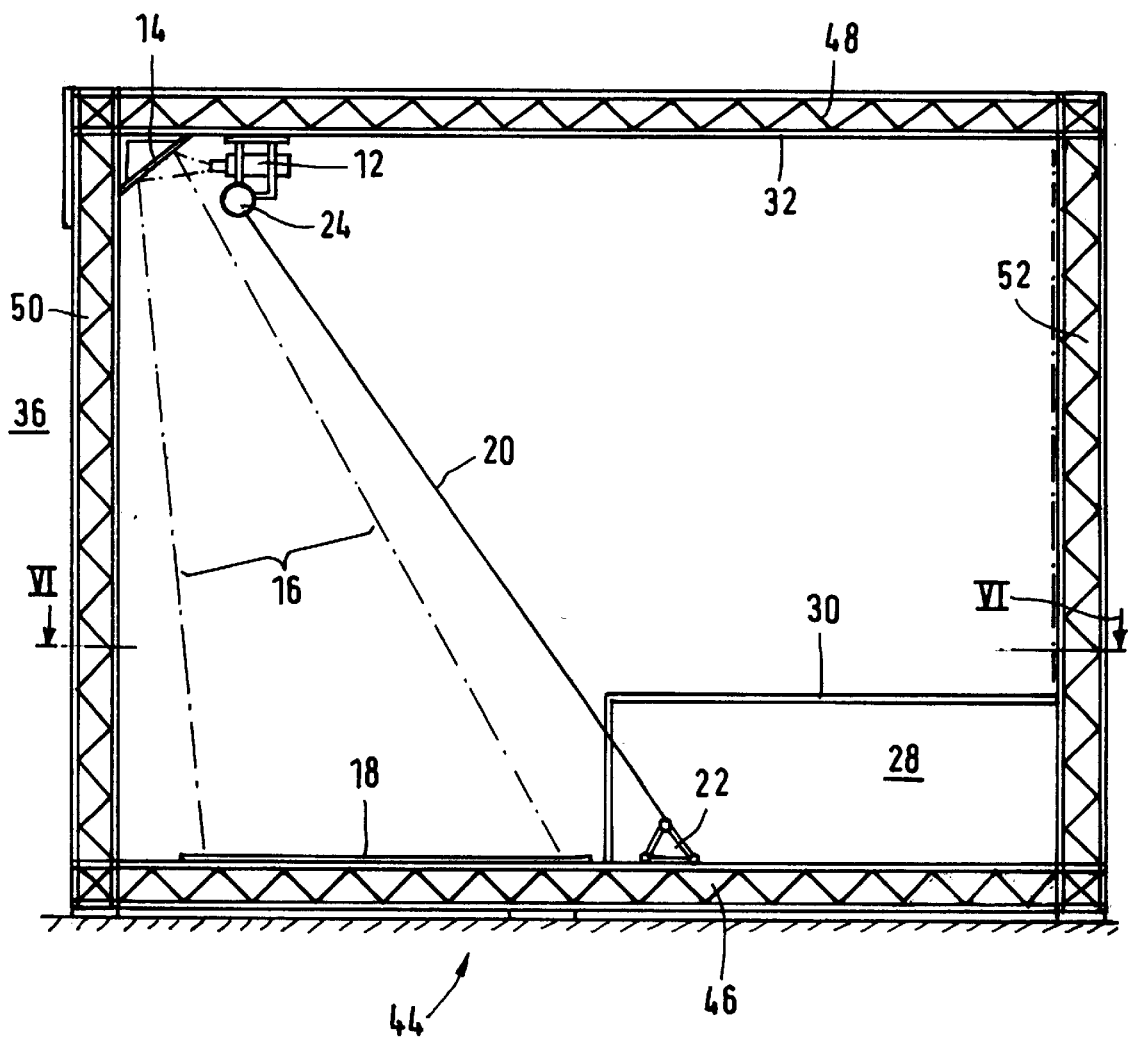

The invention will now be further described by way of the example of the embodiments illustrated in the drawing in which:

FIG. 1 is a simplified diagrammatic side view of the apparatus according to the invention, FIG. 2 is a more detailed diagrammatic side view of the apparatus according to the invention, simultaneously showing the auditorium, FIG. 3 is a side view of the stage similarly to the illustration in FIG. 2 with the floor lowered, FIG. 4 is a view of the auditorium and the stage looking in the direction of the line IV—IV in FIG. 2, FIG. 5 is a side view of the apparatus according to the invention when using the lattice frames surrounding it, and FIG. 6 is a view in the direction of the line VI—VI.

FIG. 1 shows the physical principle of the apparatus according to the invention with the computer-controlled intelligent light amplifier 12 which acts as an image source, the mirror 14 which in the view in FIG. 1 is arranged to the left in front of it and which projects the light radiated on to it from the light amplifier 12 on to the reflecting surface 18 in the form of a light cone 16 as indicated by two broken lines, the foil 20 with its lower holding means in the form of a mounting bracket 22 and its upper holding means in the form of a winding tube 24 and the virtual image 26 which is represented in the background of the stage. The computer-controlled intelligent light amplifier 12 projects a moving image on to the mirror 14. This projects it on to the reflecting surface 18 which projects it on to the foil 20. From the point of view of a viewer who is at the left in FIG. 1—see FIG. 2—a moving image appears in the background as a virtual image 26.

FIGS. 2 and 3 show a practical application of the apparatus according to the invention at a presentation or lecture function. More specifically FIG. 2 again shows the stage 28, the floor 30 thereof and the ceiling 32 thereof. Extending under the ceiling 32 of the stage 28 over the entire width thereof is a curtain or a cover rail or board 34. It covers over in a forward direction the computer-controlled intelligent light amplifier 12 and the mirror 14. The viewers 38 sit in the auditorium 36. The presenter or lecturer 40 stands on the stage 28 behind the reflecting surface 18. The reflecting surface 18 is for example a projection screen or a coat of white paint. The double-headed arrow shown under the floor 30 is intended to indicate that it can be raised and lowered. FIG. 2 shows the floor 30 at its normal height. The virtual image 26 appears in the background of the stage 28 at a given location. FIG. 3 shows the same stage 28 with the floor 30 lowered. When the floor 30 is lowered the virtual image 26 moves rearwardly, towards the right when looking at FIGS. 2 and 3.

FIG. 4 shows a practical application of the apparatus according to the invention in a presentation function relating to motor vehicles. FIG. 4 shows a presentation article 42, in this example being a motor vehicle. The viewers 38 see it in the background as a virtual image. They do not recognise that this involves a reflection at the reflecting surface 18 and the foil 20. They only see how the presenter 40 moves freely in front of the motor vehicle, points with his arms and hands to the motor vehicle and parts thereof, explains details in words, and in so doing neither interferes with nor in any way influences the reproduction of the motor vehicle in the background in the form of the virtual image 26.

FIGS. 5 and 6 show the transportable embodiment of the apparatus according to the invention, which can be set up at any desired location. Lattice frames 44 which can be set up at both sides of the apparatus serve for that purpose. Each lattice frame comprises a lower girder portion 46, an upper girder portion 48, a front girder portion 50 and a back girder portion 52. Lattice frames of that kind are known. Each girder portion comprises a plurality of parts which can be releasably connected together. For the purposes of erecting the apparatus, the parts of the girder portions are fitted together and joined together. For transportation purposes they are separated from each other and can be transported in the form of comparatively small units on a truck or the like. As shown in FIG. 5 the computer-controlled intelligent light amplifier 12 and the winding tube 24 are fixed to a bracket. The bracket is in turn fixed to a transverse strut which connects the two upper girder portions 48. The same applies in regard to the mirror 14. When the apparatus is erected the foil 20 is pulled off the winding tube 24, fixed to the mounting bracket 22 and then tensioned. The reflecting surface 18 is laid on the floor in the form of a plate or the like which is coated or painted white, or in the form of a projection screen. The stage 28 on which the presenter 40 stands when making his presentation is composed of parts which are known per se on their own and it is erected in the rearward region of the apparatus.

I claim:

1. Apparatus for representing moving images in the background of a stage using an image source, said stage including a floor, a ceiling disposed vertically above said floor and a background disposed therebetween, said apparatus characterised in that a reflecting surface (18) is arranged on said floor (30) of said stage (28) in the central region thereof, a transparent smooth foil (20) extends between said floor (30) and said ceiling (32) at a position which is disposed further forwardly, and the image source is arranged at the ceiling

(32) in front of the upper end of the foil (20) which is held there, and is directed on to the reflecting surface (18).

2. Apparatus as set forth in claim 1 characterised in that the foil (18) extends at an angle of about 45° relative to the floor (30) of the stage (28).

3. Apparatus as set forth in claim 1 or claim 2 characterised in that the image source is a computer-controlled intelligent light amplifier (12).

4. Apparatus as set forth in claim 3 characterised in that a mirror (14) is arranged in front of the computer-controlled light amplifier (12) and said light amplifier is directed on to the mirror (14) and the mirror (14) receives the light radiated from the light amplifier (12), is directed on to the reflecting surface (18) and projects the light on to said reflecting surface.

5. Apparatus as set forth in claim 4 characterised in that the light amplifier (12) and the mirror (14) are covered over forwardly by a curtain extending over the entire width of the stage (28).

6. Apparatus as set forth in claim 1 characterised in that the foil is subject to a tensile stress.

7. Apparatus as set forth in claim 6 characterised in that the foil (20) has a surface area of at least 3 m times 4 m.

8. Apparatus as set forth in claim 7 characterised in that the foil (20) is rolled on a winding tube (24) and can be pulled off same and can be fixed with its free end in a support mounting (22).

9. Apparatus as set forth in claim 1 characterised in that the reflecting surface (18) is a coat of white paint.

10. Apparatus as set forth in claim 1 characterised in that the reflecting surface (18) is a white projection screen.

11. Apparatus as set forth in claim 1 characterised in that the floor (30) of the stage (28) can be raised and lowered.

12. Apparatus as set forth in claim 4 characterised in that light amplifier (12), mirror (14), reflecting surface (18), foil (20) and stage (28) are enclosed by a lattice frame (44) and can be fixed thereto.

13. Apparatus as set forth in claim 12 characterised in that the lattice frame (44) includes two units which can be set up on both sides of the stage (28) and each unit has a lower girder portion (46), an upper girder portion (48), a front girder portion (50) and a back girder portion (52).

14. Apparatus as set forth in claim 13 characterised in that the two lattice frame units which can be set up on both sides of the stage (28) can be connected by transversely extending struts.

15. Apparatus as set forth in claim 4 characterised that the light amplifier (12) and the mirror (14) are covered over forwardly by a cover bar (34) extending over the entire width of the stage (28).

* * * * *